(12) United States Patent  
Petersen et al.

(10) Patent No.: US 7,822,649 B2
(45) Date of Patent: Oct. 26, 2010

(54) METHODS FOR ELECTRONIC COMMERCE USING AGGREGATED CONSUMER INTEREST

(75) Inventors: Chad Petersen, Rochester, MN (US); Doan Trinh, Windermere, FL (US)

(73) Assignee: eHaggle, LLC, Spring Park, MN (US)

( * ) Notice: Subject to any disclaimer, the term of this patent is extended or adjusted under 35 U.S.C. 154(b) by 0 days.

(21) Appl. No.: 12/210,050

(22) Filed: Sep. 12, 2008

(65) Prior Publication Data

US 2009/0327118 A1    Dec. 31, 2009

Related U.S. Application Data

(63) Continuation of application No. 12/163,849, filed on Jun. 27, 2008.

(51) Int. Cl.
*G06Q 30/00* (2006.01)
(52) U.S. Cl. ........................................................ 705/26
(58) Field of Classification Search .................. 705/26, 705/27
See application file for complete search history.

(56) References Cited

U.S. PATENT DOCUMENTS

| | | | |
|---|---|---|---|
| 7,124,107 | B1 | 10/2006 | Pishevar et al. |
| 2001/0014868 | A1 | 8/2001 | Herz et al. |
| 2001/0032165 | A1 | 10/2001 | Friend et al. |
| 2001/0042002 | A1 | 11/2001 | Koopersmith |
| 2001/0051901 | A1 | 12/2001 | Hager et al. |
| 2002/0004753 | A1* | 1/2002 | Perkowski .................... 705/26 |
| 2002/0026390 | A1 | 2/2002 | Ulenas et al. |
| 2002/0069118 | A1 | 6/2002 | Zylstra |
| 2002/0128923 | A1 | 9/2002 | Dale |
| 2003/0028451 | A1 | 2/2003 | Ananian |

(Continued)

FOREIGN PATENT DOCUMENTS

GB        2458388 A      9/2009

(Continued)

OTHER PUBLICATIONS

"U.S. Appl. No. 12/163,849, Non Final Office Action mailed Aug. 5, 2009", 6 pgs.

(Continued)

*Primary Examiner*—Mila Airapetian
(74) *Attorney, Agent, or Firm*—Schwegman, Lundberg & Woessner, P.A.

(57) ABSTRACT

This present subject matter includes a method for processing product selections by a plurality of consumers operating one or more web browsers, comprising collecting electronic information, including product identifying information, about the product selections by each consumer of the plurality of consumers, the product selections selected by the plurality of consumers from offerings at a plurality of disparate websites, associating information related to a consumer identified with a particular product selection with the product identifying information, associating the product identifying information with a Universal Product Code (UPC) for the product selections, aggregating the electronic information in a database, the information categorized by each consumer and UPC code, processing counts of selections by the plurality of consumers organized at least by UPC code, requesting product fulfillment bids from one or more suppliers using the counts and obtaining one or more product fulfillment bids from the one or more suppliers. Other examples provide a method for processing service selections by a plurality of consumers operating one or more web browsers.

20 Claims, 9 Drawing Sheets

U.S. PATENT DOCUMENTS

| | | |
|---|---|---|
| 2004/0039650 A1 | 2/2004 | Lentz |
| 2005/0091156 A1 | 4/2005 | Hailwood et al. |
| 2006/0271972 A1* | 11/2006 | Pai et al. .................... 725/86 |
| 2008/0097872 A1* | 4/2008 | Peckover .................... 705/26 |
| 2008/0208676 A1* | 8/2008 | Williams et al. ............. 705/10 |
| 2009/0327034 A1 | 12/2009 | Petersen |
| 2009/0327038 A1 | 12/2009 | Petersen |
| 2009/0327092 A1 | 12/2009 | Petersen et al. |

FOREIGN PATENT DOCUMENTS

| | | |
|---|---|---|
| JP | 2007299083 A | 11/2007 |
| KR | 2007013048 A | 1/2007 |

OTHER PUBLICATIONS

"U.S. Appl. No. 12/163,642, Non Final Office Action mailed Jun. 24, 2009", 20 pgs.

"U.S. Appl. No. 12/163,642, Response filed Nov. 24, 2009 to Non Final Office Action mailed Jun. 24, 2009", 11 pgs.

"U.S. Appl. No. 12/163,849, Response filed Dec. 7, 2009 to Non Final Office Action mailed Aug. 5, 2009", 8 pgs.

"U.S. Appl. No. 12/210,011, Examiner Interview Summary mailed Jul. 24, 2009", 2 pgs.

"U.S. Appl. No. 12/210,011, Non-Final Office Action mailed Jul. 8, 2009", 3 pgs.

"U.S. Appl. No. 12/210,011, Response filed Dec. 8, 2009 to Non Final Office Action mailed Jul. 8, 2009", 15 pgs.

"U.S. Appl. No. 12/163,642 Final Office Action mailed Feb. 26, 2010", 24 pgs.

"U.S. Appl. No. 12/210,011, Final Office Action mailed Mar. 1, 2010", 24 pgs.

"U.S. Appl. No. 12/163,849 , Non-Final Office Action mailed Mar. 15, 2010", 6 pgs.

\* cited by examiner

METHODS FOR ELECTRONIC COMMERCE USING AGGREGATED CONSUMER INTEREST

RELATED APPLICATIONS

This application is a continuation of U.S. patent application Ser. No. 12/163,849 filed Jun. 27, 2008, which is incorporated herein by reference and made a part hereof. This application is related to U.S. patent application Ser. No. 12/163,642 filed Jun. 27, 2008, and U.S. patent application Ser. No. 12/210,011 filed Sep. 12, 2008, and which is incorporated herein by reference and made a part hereof.

FIELD

This application relates to electronic commerce systems and more particularly to methods and apparatus for electronic commerce using aggregated consumer interest.

BACKGROUND

Online commerce has become a substantial industry of its own as the Internet and World Wide Web have evolved, reaching an estimated $31.1 billion for the 2007 holiday season including November and December 2007 (eMarketer, November 2007). For sellers, online commerce represents a relatively inexpensive method of exposing the seller's items to a large number of potential buyers. For buyers, online commerce represents an opportunity to get bargains from the reduced cost of sales and ease of research about the purchase. Economic supply and demand theory predicts that the potential to increase the benefit of both the sellers and buyers exists if buyers can pool their individual interests and collectively bargain with a seller. However, buyers typically do not want to commit to a sale until they know a price, and sellers cannot give volume discount pricing until they know the volume. Therefore, striking a bargain with either unknown prices or unknown volume is difficult, if not impossible outside of a trust relationship. What is needed in the art is a system for commerce that incentivizes buyers to safely express their interest and sellers to provide offers based on that interest to achieve more economically efficient transactions.

SUMMARY

The present subject matter provides, in various embodiments, a method for processing product selections by a plurality of consumers operating one or more web browsers, comprising collecting electronic information, including product identifying information, about the product selections by each consumer of the plurality of consumers, the product selections selected by the plurality of consumers from offerings at a plurality of disparate websites, associating information related to a consumer identified with a particular product selection with the product identifying information, associating the product identifying information with a Universal Product Code (UPC) for the product selections, aggregating the electronic information in a database, the information categorized by each consumer and UPC code, processing counts of selections by the plurality of consumers organized at least by UPC code, requesting product fulfillment bids from one or more suppliers using the counts and obtaining one or more product fulfillment bids from the one or more suppliers.

In some embodiments, a method is provided for processing service selections by a plurality of consumers operating one or more web browsers, the method comprising collecting electronic information, including web page titles, about the service selections by each consumer of the plurality of consumers, the service selections selected by the plurality of consumers from offerings at a plurality of disparate websites, associating a information related to a consumer identified with a particular service selection with the electronic information, aggregating the electronic information in a database, the information categorized by web page information and by each consumer, processing counts of selections by the plurality of consumers organized at least by web page title, requesting service fulfillment bids from one or more service suppliers using the counts and obtaining one or more bids from the one or more service suppliers.

This Summary is an overview of some of the teachings of the present application and is not intended to be an exclusive or exhaustive treatment of the present subject matter. Further details about the present subject matter are found in the detailed description and the appended claims. The scope of the present invention is defined by the appended claims and their legal equivalents.

DETAILED DESCRIPTION

The following detailed description refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

A system is provided for aggregating consumer interest in a variety of consumer identified items and developing commerce based on the aggregated consumer interest. Items are identified when the consumers select items of interest using the system. Consumer selections are made by a variety of methods including, but not limited to, using a dedicated web site to identify selections and/or a software tool installed on the consumer's computer or Internet compatible mobile device. The system allows a registered consumer to store information about items of interest, such as items the consumer is likely to consider purchasing, on a database of the system. The items are transmitted to the database through a consumer initiated selection process. In one scenario, the selection process is initiated by the consumer identifying an item of interest on a web page while surfing the Internet. The consumer then completes the selection by activating the software tool so that electronic information relating to the item of interest is transmitted to the system database. The database aggregates consumer selection information according to a number of possible criteria including one or more of the type of item, Universal Product Codes (UPC) (identifying a product), complimentary services, suppliers capable of supplying the item, manufacturers of an identified product and combinations thereof. In various embodiments, the system monitors the aggregated interest information and solicits item fulfillment bids from one or more suppliers when threshold levels of interest indicate sufficient demand for one or more items. The decision to solicit bids ultimately rests with the intermediate purchasing agent and can be made without reference to a threshold level. In some embodiments, a trigger to solicit item fulfillment bids is automated on an item by item basis and a minimum threshold level of consumer interest is programmed for such products. Bids are received from the suppliers and, depending on the bid request, a sale of the item is conducted electronically.

Figure 7:
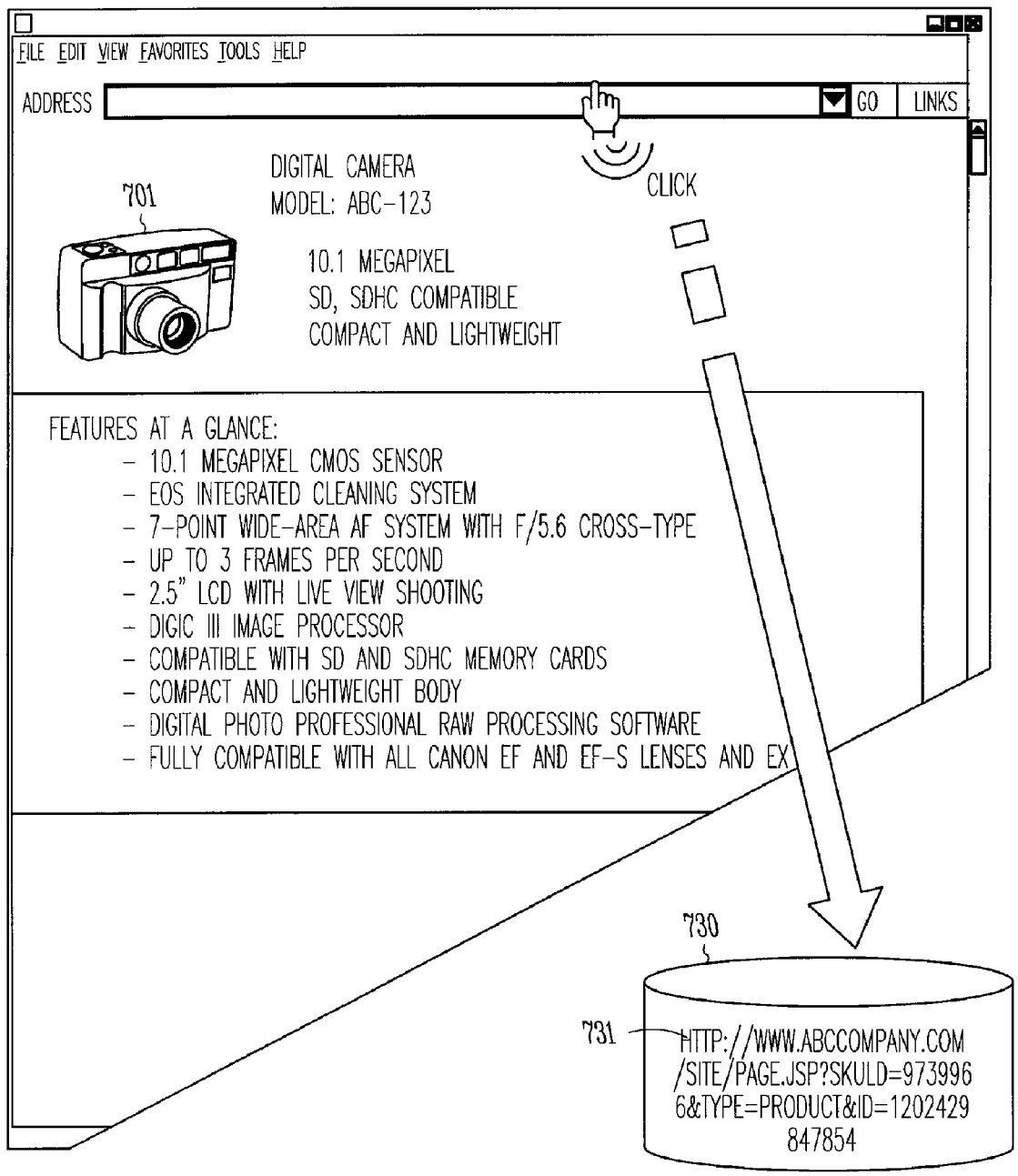
FIG. 7 shows a screen shot of a consumers' browser with a software tool according one embodiment of the present subject matter.

In general, in one application of the present system a consumer/user of the system registers with the system and downloads a software tool for transmitting information about items that interest the consumer. FIG. 7 illustrates a screen shot of a consumers' browser with a software tool according to one embodiment of the present subject matter. Upon finding an item of interest 701, the consumer clicks the software tool 702 and information 731 about the item is electronically transmitted to a system database 703. In many cases, item selections are made while the consumer "surfs" the Internet. The consumer selects an item of interest by activating the software tool 702. Upon selection, the software tool 702 transmits information 731 about the web page the consumer selected to the system database 703. In various embodiments, the consumer manually enters data about items of interest using a dedicated web site. The dedicated web site allows consumers to manually enter item data to the system database by typing, for example, a Universal Resource Locator (URL) related to the item into a field of the dedicated web site, or alternatively, cutting and pasting the URL into the field. Some embodiments include a hot-key combination for entering electronic service information from one web page into one or more fields of the dedicated system web page. Manually entered item information is not limited to a URL, nor is a URL required. Service descriptions, suppliers, retailers, product model numbers, UPCs and stock keeping unit (SKU) code are additional examples of item identifying information a consumer can manually enter to the website to identify an item of interest. Software applications, and if necessary clerical staff, can be used to decode the information transmitted to the system database and associate the consumer's selection with a product or service. Each selection made by a particular consumer is available to that consumer through a controlled access website. In various embodiments, the consumer monitors and manages their selections using the website.

The database data is processed by the system to evaluate aggregate interest in items associated with the consumer selections. When interest in one or more items reach a level of interest (which could be defined by a predetermined threshold), the system invites vendors registered with the system to submit bids to fulfill an estimated demand. Upon receiving and evaluating one or more bids, the system may initiate the offering of an item. Consumers associated with the item by way of their prior selections are notified of the offering. If enough consumers are inclined to commit to a purchase, the consumers (now buyers) and suppliers are notified of the sale and the transaction is performed.

In some applications of the system, sales are performed when consumer accounts are charged for each item sold and the consumer's shipping address and order are forwarded to the supplier for prompt shipment or service. Other vehicles for completion of the sales can be used without departing from the scope of the present subject matter. For example, in one embodiment, sales can be conducted directly between the consumer (now a buyer) and the supplier. In one embodiment, sales can be conducted using a third party intermediary. In various embodiments, depending on the nature of the transaction, an intermediary can be used to keep the buyer's identity from the supplier. In some embodiments, the supplier's identity may also be kept from the buyer. Other approaches and embodiments are possible without departing from the scope of the present subject matter. The system leverages various Internet and communication technologies to aggregate consumer demand, solicit vendors for their best price based on that demand and efficiently complete transactions. The system allows consumers to aggregate and anonymously and independently reflect their wants and desires in products and services to the aggregating system, and the aggregating system can broker the estimated disparate demand to multiple vendors. The system also provides opportunities for vendors to efficiently sell large quantities of products or services to customers who have an interest in such products and services.

Figure 1:
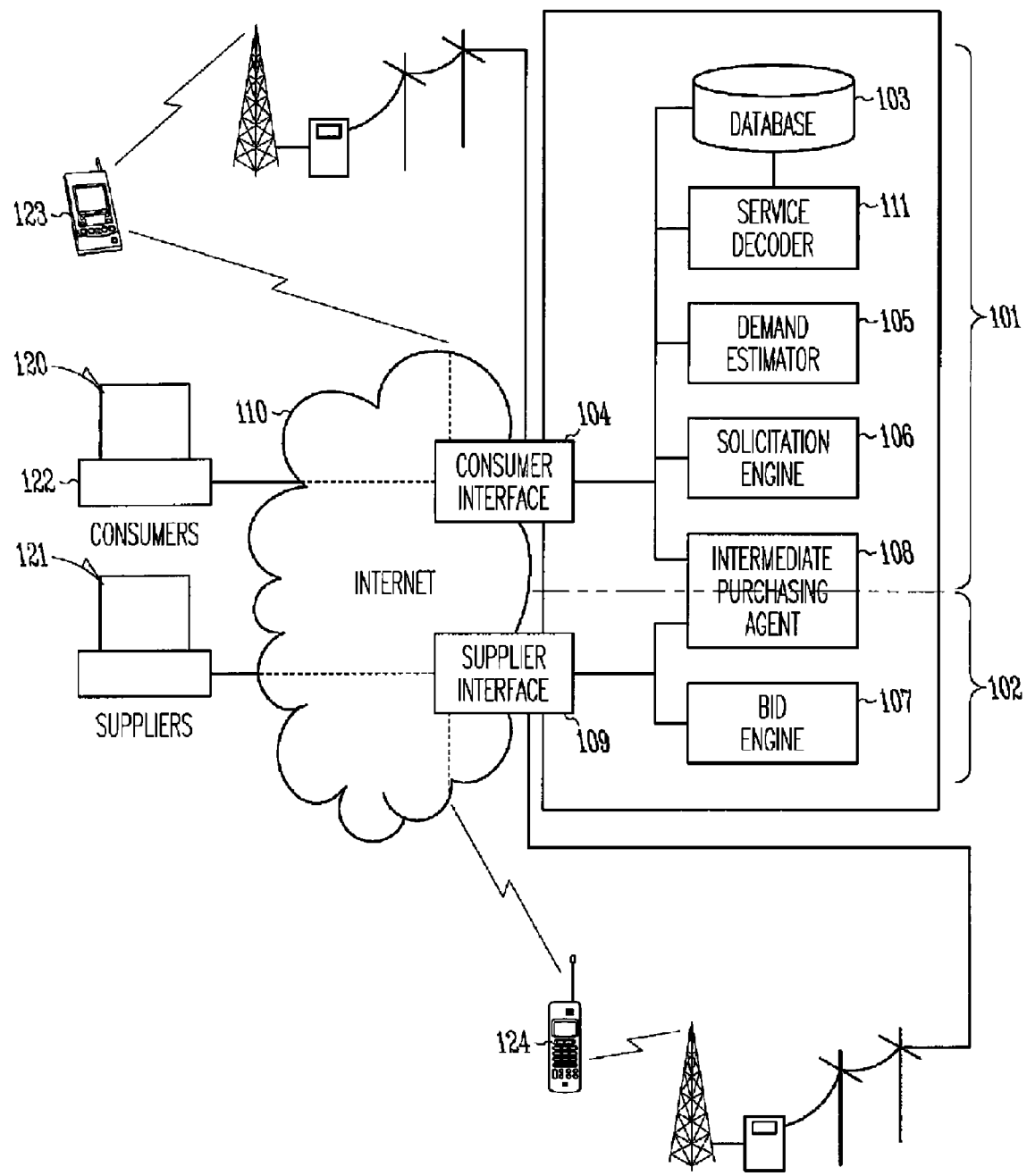
FIG. 1 illustrates a block diagram of a system for aggregating interest in services using the Internet according to one embodiment of the present subject matter.

FIG. 1 illustrates a block diagram of a system for aggregating interest in services using the Internet according to one embodiment of the present subject matter. The system includes two portions, a consumer-centric portion 101 and a supplier-centric portion 102. The consumer-centric portion 101 of the system includes a database 103 for, among other things, aggregating information about services selected by the consumers 120 and associating each service selection with the consumer who selected it. The consumer-centric portion 101 of the system also includes a consumer interface 104 to the system, a demand estimator 105 and a solicitation engine 106. The supplier-centric portion 102 of the system includes a supplier interface 109 and a bid engine 107. An intermediate purchasing agent 108 spans both the consumer-centric portion 101 of the system and the supplier-centric portion 102 of the system. The intermediate purchasing agent 108 can provide a number of beneficial services, such as controlling information passed between consumers 120 and suppliers 121, and can even maintain anonymity between each if desired. Additionally, the intermediate purchasing agent 108 can operate the solicitation engine 106 and the bid engine 107, and assist in completing sales between the consumers 120 and the suppliers 121.

The consumer interface 104 is a component of the consumer-centric portion 101 of the system and provides consumer connections to the system, including connections using the Internet 110 and mobile communication systems. In various embodiments, the consumer interface 104 includes an authentication feature to control access to the interface 104. In various embodiments, the consumer interface 104 allows information about services from various online locations selected by the consumer, including websites, to be stored in the system database 103. In various embodiments, a software tool is downloaded from consumer interface 104 for installation on the consumer's web browser device, such as a computer 122, Internet compatible cell phone and/or Personal Digital Assistant (PDA) 123.

In various embodiments, after a consumer registers with the system, the consumer can download and install a version of the software tool. As the consumer browses various web sites and notices a service that interests the consumer, the consumer can activate the software tool to automatically transmit information about the website, including information that may identify the service to the system database 103. The database associates the consumer with the selected service information in the database. In another scenario, the consumer may see an advertisement for a service while watching television or reading a magazine. The consumer can use the software tool or web browser to manually enter and transmit information about the service to the database 103. Alternatively, the consumer may locate the service on a supplier website and activate the software tool to automatically transmit information about the website, including information that may identify the service to the system database. In various embodiments, the software tool is implemented as a toolbar associated with the consumer's device web browser.

The information transmitted using the web browser and/or software tool is used by the system to identify services selected by the consumer, associate a system service identifier with the information and count the number of consumer selections associated with the service represented by each system service identifier or a group of related services. For example, a consumer browsing the Internet may find a service offering the consumer is interested in at a web site with a Uniform Resource Locator (URL).

And a web page header:

Bob's Lawn Service—Windows Internet Explorer.

Upon using the consumer's web browser and/or software tool, the above URL and web header is transmitted to the system 101. In various embodiments, the system 101 includes a URL decoder to associate a system service identifier with the consumer's service selection. However, at least in this example, the URL does not by itself provide adequate data for identifying the service. A web page header associated with the service selection will often contain specific information concerning the service or services displayed on the selected web page. In this example, the header information provides a detailed description of the service discussed on the web page, a lawn service. In some embodiments, the URL decoder includes a web page header decoder to identify and associate a system service identifier with the selected service information. In various embodiments, decoding information transmitted using the web browser and/or software tool is completed automatically. In some embodiments, decoding the information from the web browser and/or software tool includes manual and automatic decoding. As more and more consumers select a particular service, the system counts the number of consumer selections and associates the count with the particular service for further analysis.

In various embodiments, the consumer interface 104 includes functionality for the consumer to view the consumer's past service selections. In various embodiments, the consumer interface 104 includes a number of functions to assist the consumer 120 to organize and review the consumer's selections. For example, one function allows the consumer to tag information to each selection. The tag, for example, may serve to name, rename, edit or update a selected service or information related to the service selection, remind the consumer of when the service was discovered, what the consumer remembers about the service that is not apparent from the information collected by the system, as well as, other information the consumer cares to note. Another function example, in combination with the database, allows the consumer to place services in one or more lists, or list groups, and tag a name to the list or list group. For example, the consumer may make a gift list and tag each service selection with a person for subsequent gift ideas. In another example, the consumer creates an organization structure such that each service can be associated and tagged with a room in the consumer's home. For example, upon selecting a service, the consumer associates the product with the "bathroom", "kitchen", "garage", "yard", "car" or "bedroom".

As discussed herein, the database 103 aggregates consumer selections and allows each consumer to organize their selections. The database 103 also associates a consumer to their selections. In various embodiments, the database 103 stores consumer registration information, including information for completing a purchase using the system, such as a preferred method of payment, account information, shipping address or combinations thereof.

The demand estimator 105 analyzes the service information stored in the database 103 and processes the information for generating demand estimates. A demand estimate provides an indication of how many services consumers will buy if subsequently offered for purchase on the system. A particular demand estimate may be associated with a particular service, a group of similar services, a group of complimentary services or a group of services associated with a particular supplier. In one embodiment, for example, one demand estimate for a particular service is the count of consumer selections associated with the service. In various embodiments, the demand estimator uses one or more additional parameters to determine the demand estimate. For example, in addition to the count of selections for a particular service, the demand estimator may use age of the consumer selections, average cost of the particular service, current buying season, historical buy through of the service from previous opportunities to purchase the service, or historical buy through of the consumers associated with the service's selections or combinations thereof, to increase or decrease a demand estimate for a service or group of services. A goal of the system is to provide accurate demand estimates such that supplier risk is reduced in providing discounts when bidding to fulfill a demand for a service or group of services. Additionally, reduced supplier risk will encourage more supplier bids and, thus, more competitive supplier bids to supply the estimated demand.

The intermediate purchasing agent 108 is a component of the system that uses the demand estimates generated by the demand estimator 105. In various embodiments, the intermediate purchasing agent 108 monitors and compares a demand estimate to a predetermined threshold. If a demand estimate satisfies the threshold, the intermediate purchasing agent 108 triggers the bid engine 107 of the supplier-centric portion 102 of the system. In various embodiments, the intermediate purchasing agent tracks statistics related to the demand estimate, such as aggregation rate of particular products. The various statistics are made available to users of the system to encourage commerce activity. In some embodiments, the intermediate purchasing agent triggers the bid engine regardless of the demand estimate, for example when a service supplier provides an unsolicited bid.

The bid engine 107 distributes requests for service fulfillment bids to the suppliers 121 and receives service fulfillment bids from the suppliers. In various embodiments, the bid engine 107 notifies one or more suppliers to request a service fulfillment bid electronically. Electronic notifications formats include, for example, electronic messaging to notify suppliers of a request for a fulfillment bid. Electronic messaging includes e-mail, text messaging and electronic data interchange (EDI). A bid request can have various formats. For example, a bid request may be distributed to a particular supplier for a particular quantity of a particular service. Another bid request may be distributed to a particular supplier for various quantities of a group of different services. Another bid request may be distributed to two or more suppliers for a particular service. A bid request can be distributed to two or more suppliers for a various quantities of a group of different services. In various embodiments, the requests for service fulfillment bids are distributed using the supplier interface. In some embodiments, the supplier interface uses a display. In some embodiments, requests for service fulfillment bids are distributed using a dedicated website. In some embodiments, the request for service fulfillment bids is transmitted to a supplier's mobile communication device 124, such as a cell phone or PDA.

Upon distributing a service fulfillment bid request, the bid engine 107 receives bids from the suppliers 121. In various embodiments, the bids are received using a display portion of the supplier interface, such as a dedicated website. In some embodiments, supplier bids are received electronically using EDI, email or text messaging. For example, in one scenario, a supplier could use a cell phone 124 or Internet compatible PDA to quickly respond to a service fulfillment bid request distributed to the supplier using SMS text messaging. Such an efficient communication between the system and the supplier can enable the supplier to quickly provide a service at a competitive price without investing much time or effort to market or advertise. In various embodiments, the opportunity to respond to the service fulfillment bid request is limited.

In various embodiments, suppliers 121 are provided with demand estimate information when notified of a service fulfillment bid request. Some embodiments use a first display portion of the supplier interface 109, such as a web site, to provide suppliers with a demand estimate. In various embodiments, demand estimates are normally available at all times to any user of the system, including suppliers. Demand estimate information may induce a supplier to make an unsolicited service fulfillment bid to the bid engine 107 without first receiving a service fulfillment bid request. In various embodiments, an unsolicited bid is received by the bid engine 107 and analyzed by the intermediate purchasing agent 108. Upon qualification of the bid, an opportunity to purchase the service is developed by the intermediate purchasing agent 108 and the solicitation engine 106 is triggered to distribute notification of the opportunity to one or more of the consumers 120.

The solicitation engine notifies users about a pending or upcoming opportunity to purchase one or more services. In various embodiments, the solicitation engine 106 notifies consumers associated with services selections identifying one or more services included in the upcoming opportunity. In some embodiments, consumers are notified using electronic messaging, including, for example, e-mail and text messaging, including SMS text messaging for mobile devices.

Upon receiving notice of an opportunity to purchase a service, consumers can submit a purchase order to the system. A purchase order is submitted using the consumer interface 104. In various embodiments, the purchase order is submitted using the first display portion of the consumer interface 104, such as a dedicated web site for example. In some embodiments, consumers use a cell phone, PDA 123 or other Internet compatible wireless communication device to submit a purchase order.

In various embodiments, consumers use a portable Internet software tool, sometimes called a widget, to monitor their service selections, receive system notifications and submit purchase orders for purchasing services using the system. A portable Internet software tool is a software tool that communicates with system and can be attached to a consumer's social web page. The portable Internet software tool allows a consumer to access the consumer's data on the system remotely wherever the consumer can access his or her social networking web page.

In various embodiments, a transaction engine processes the purchase of services to each of the consumers associated with a purchase order. In various embodiments, the transaction engine automatically processes purchase requests using information stored on the database. Such information, for example, may include the consumer's preferred method of electronic payment including the account information for charging the account, and "ship to" address information associated with the consumer. In various embodiments, the supplier interface includes an order processing connection for electronically completing a consumer order on the supplier's order processing system.

In various embodiments, consumer interactions with the system are processed and recorded as historical consumer information. In some embodiments, historical consumer information is used to generate demand estimates. For example, where a consumer has selected a service, but has failed to purchase the service after one or more opportunities, the demand estimator uses this information to downgrade the interest of the consumer. Where the consumer has failed to purchase services at large discounts, the demand estimator further degrades the consumer's demand impact more than if past opportunities to purchase the service offered the service with only slight discounts over retail prices.

In various embodiments, supplier interactions with the system are processed and recorded. The historical information is used for accepting competing product fulfillment bids. For example, historical supplier data may be analyzed and result in a supplier score associated with a supplier. Upon considering a service fulfillment bid from two or more suppliers, each supplier's score may be considered to select a winning bid upon which to base an opportunity to purchase the service.

Figure 2:
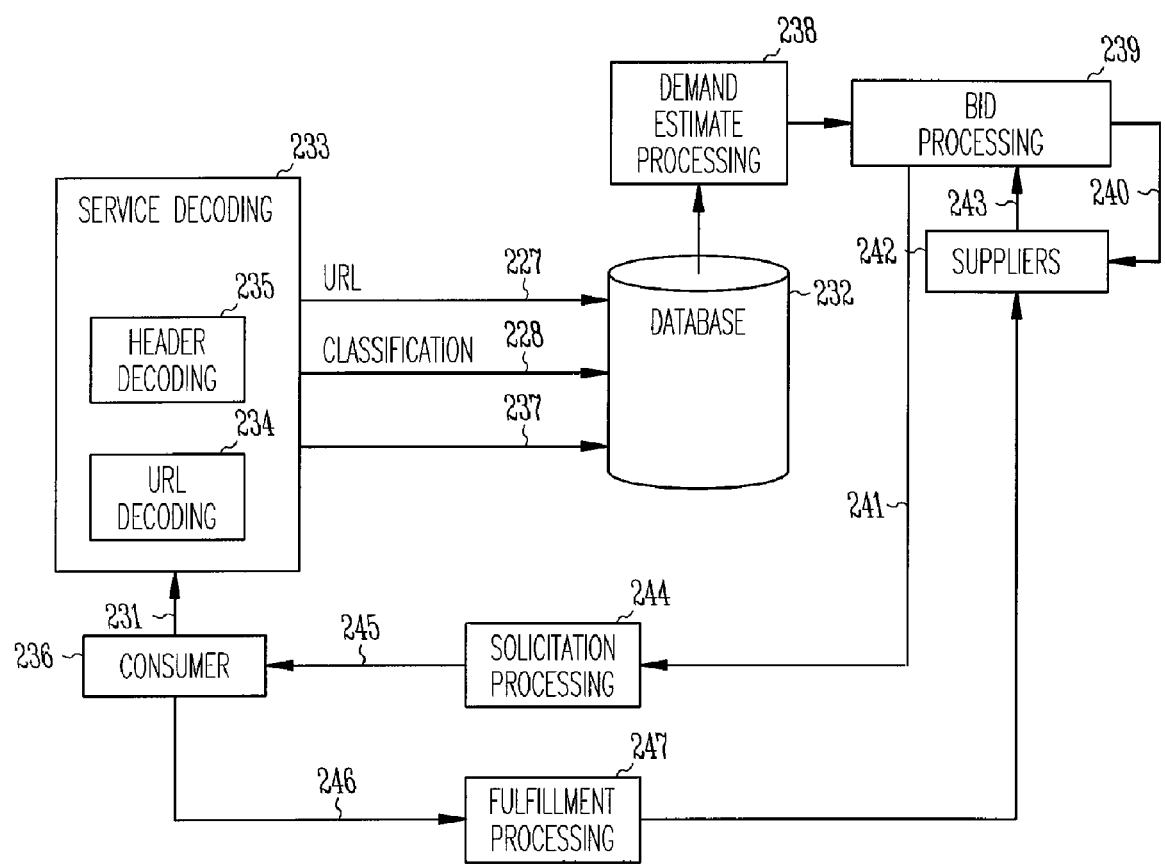
FIG. 2 is a process flow diagram of a system for aggregating consumer interest using consumer initiated selections of services according to one embodiment of the present subject matter.

FIG. 2 illustrates a process flow diagram of a system for aggregating consumer interest using consumer initiated selections of services in which the consumer is interested in or is interested in purchasing according to one embodiment of the present subject matter. It is understood that FIG. 2 is demonstrative and not intended to be exclusive or exhaustive. Consumer service selections 231 initiate a transfer of electronic service identifying information 237 to a database. In some embodiments, the consumer initiates the transfer of the service identifying information using a browser. In various embodiments, the information transmitted to the database 232 includes a website URL 227 and web page header information. In some embodiments, the URL 234 and header information 235 are decoded 233 as the information is transmitted. The URL and header information are decoded to identify the service selected by the consumer 236 and associate that information with a service classification 228 in the database 232. Alternatively, the URL and header information are collected in the database 232 and subsequently decoded 233 and associated with a service classification. As part of the transmission and decoding process, the consumer information, related to the consumer whom made the service selection, is associated with the identified electronic information 237 in the database 232.

As service information is collected in the database, demand estimates 238 are determined from the database for each identified service. Upon reaching a threshold, bid processing 239 is initiated. Bid processing 239 includes electronically requesting 240 service fulfillment bids to satisfy an associated demand estimate. Requests for service fulfillment bids may be distributed to suppliers 242 in various forms. For example, a request may be distributed to one supplier for a quantity of one particular service. Another request may be distributed to multiple suppliers for a quantity of a particular service. Yet another request may be distributed to a plurality of suppliers for various quantities of various services. Another request may be distributed to a particular supplier for quantities if various services. In some embodiments, the intermediate purchasing agent triggers the bid processing regardless of the demand estimate, for example when a service supplier provides an unsolicited bid. In various embodiments, requests for service fulfillment bids are distributed using a dedicated website.

Bid processing 239 also includes receiving 243 service fulfillment bids from one or more of the suppliers 242 in response to each request. Upon receiving one or more bids, bid processing 239 includes determining whether to offer for purchase one or more services based on a received bid.

When one or more bids are accepted 241 for developing into an opportunity for consumer purchasing, solicitation processing 244 uses the accepted bid(s) to electronically notify 245 consumers 236 of the upcoming opportunity to purchase a service. In various embodiments, at least the consumers associated with one or more of the services to be offered for purchase are notified. The solicitation process 244 receives and processes 247 purchase requests 246 from the consumers in response to the notification 245 and completes the purchase of the service or services.

Figure 3A:
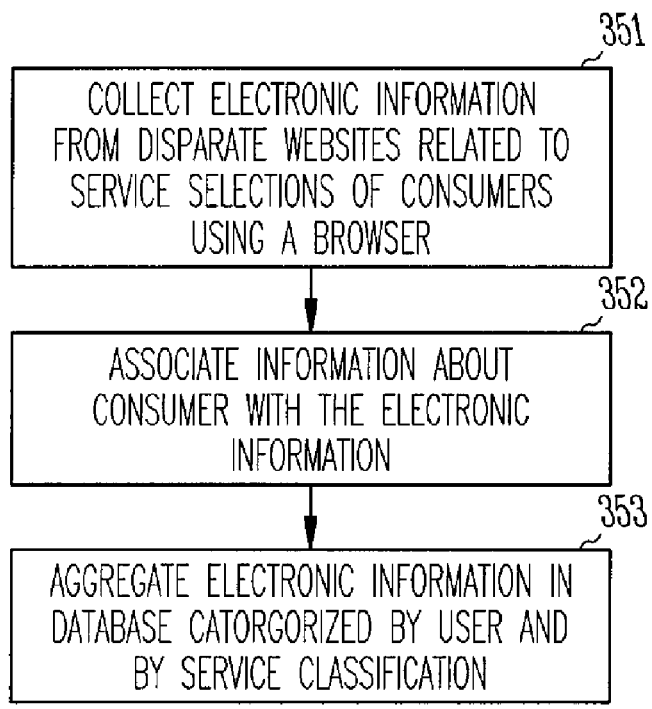
FIG. 3A is a flow diagram of a method for aggregating consumer interest in a consumer selected services according to one embodiment of the present subject matter.

FIG. 3A illustrates a flow diagram of a method for aggregating consumer interest in a consumer selected services according to one embodiment of the present subject matter. The method includes collecting electronic information, using a browser and/or software tool, about a consumer selected service using consumer initiated service selections from disparate websites 351, associating a consumer with the electronic service information 352 and aggregating the electronic service information in a database, the information categorized by consumer and by a service classification 353.

Figure 3B:
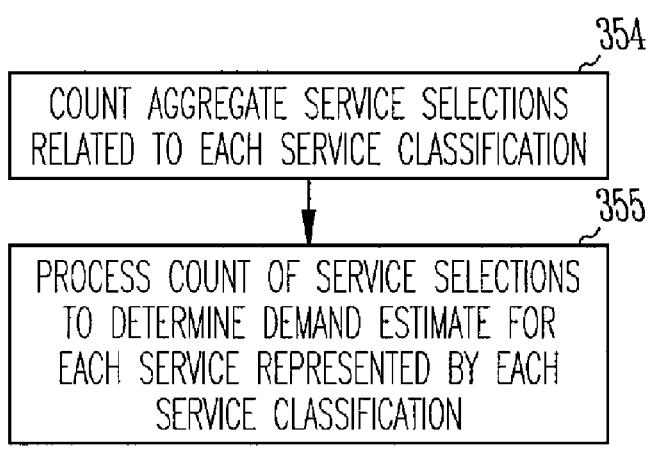
FIG. 3B is a flow diagram of a method for determining a demand estimate for a consumer selected service according to one embodiment of the present subject matter.

FIG. 3B illustrates a flow diagram of a method for determining a demand estimate for a consumer selected service according to one embodiment of the present subject matter. The method includes counting service selections related to each service classification 354 and processing the count to determine a demand estimate for each service represented by each service classification 355. In various embodiments, historical consumer data is used to de-rate the count associated with a service classification to determine a demand estimate for the service represented by the service classification. Historical data, for example, may include data related to past interactions of each user with the system, including a measure related to how often a consumer purchased a service in which the consumer indicated interest in the service through a service selection.

Figure 3C:
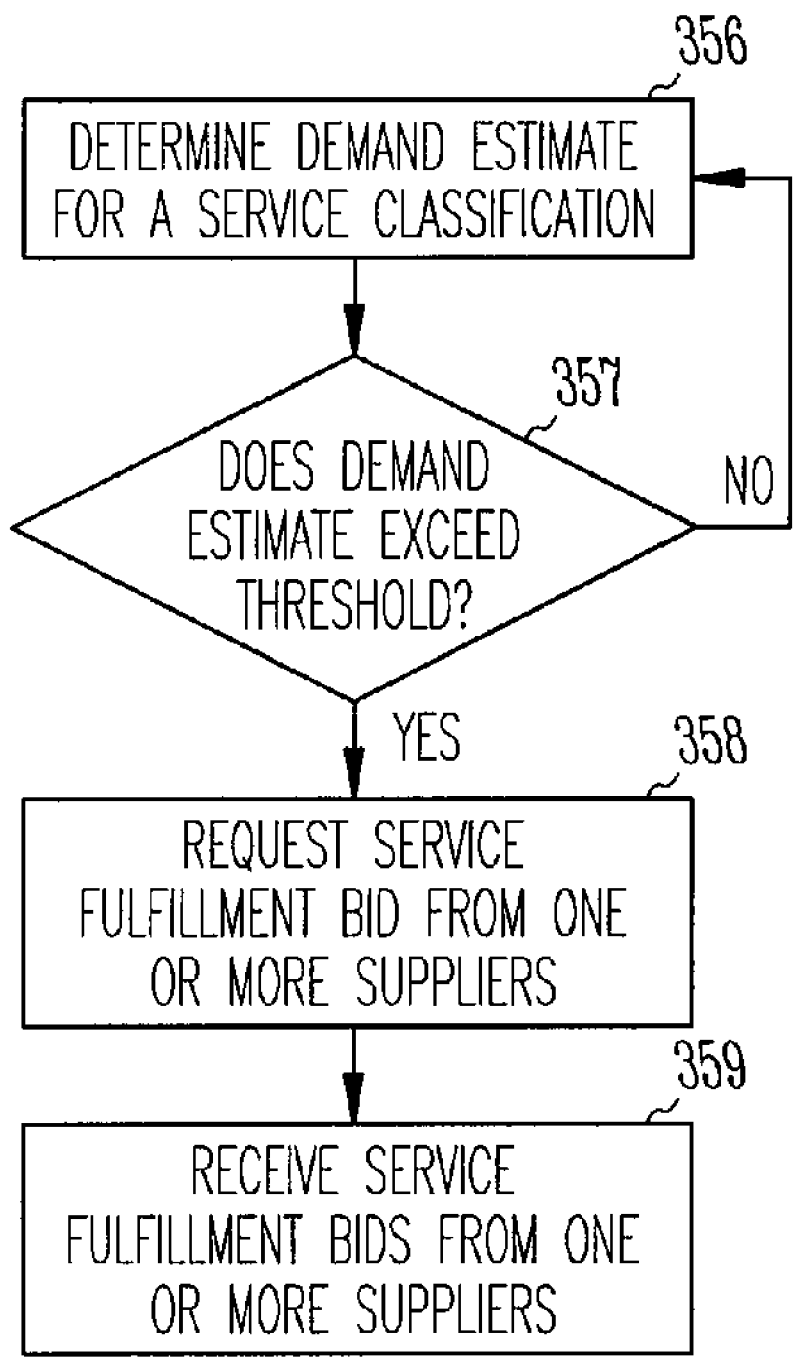
FIG. 3C is a flow diagram of a method for requesting service fulfillment bids according to one embodiment of the present subject matter.

FIG. 3C illustrates a flow diagram of a method for requesting service fulfillment bids according to one embodiment of the present subject matter. The method includes determining a demand estimate for a service classification 356. In various embodiments, the demand estimate is related to a count of consumer service selections associated with service information stored on a system database. The method further includes evaluating the demand estimate against a threshold 357. If the demand estimate does not exceed the threshold, the process continues to update the demand estimate and evaluate it against the threshold. Where the demand estimate for a service exceeds the threshold, service fulfillment bids are requested from one or more suppliers associated with the service 358. In various embodiments, the requests are distributed using electronic messaging. Examples of electronic messaging include e-mail, and text messaging including SMS text messaging for mobile devices. In some embodiments, the requests are distributed electronically using Electronic Document Interchange (EDI). The method further includes receiving service fulfillment bids from one or more suppliers 359. In various embodiments, the service fulfillment bids are received using electronic messaging. Examples of electronic messaging include e-mail, and text messaging including SMS text messaging for mobile devices. In some embodiments, the service fulfillment bids are received electronically using Electronic Document Interchange (EDI). In various embodiments, suppliers can manually submit service fulfillments bids using the dedicated system website.

Figure 4:
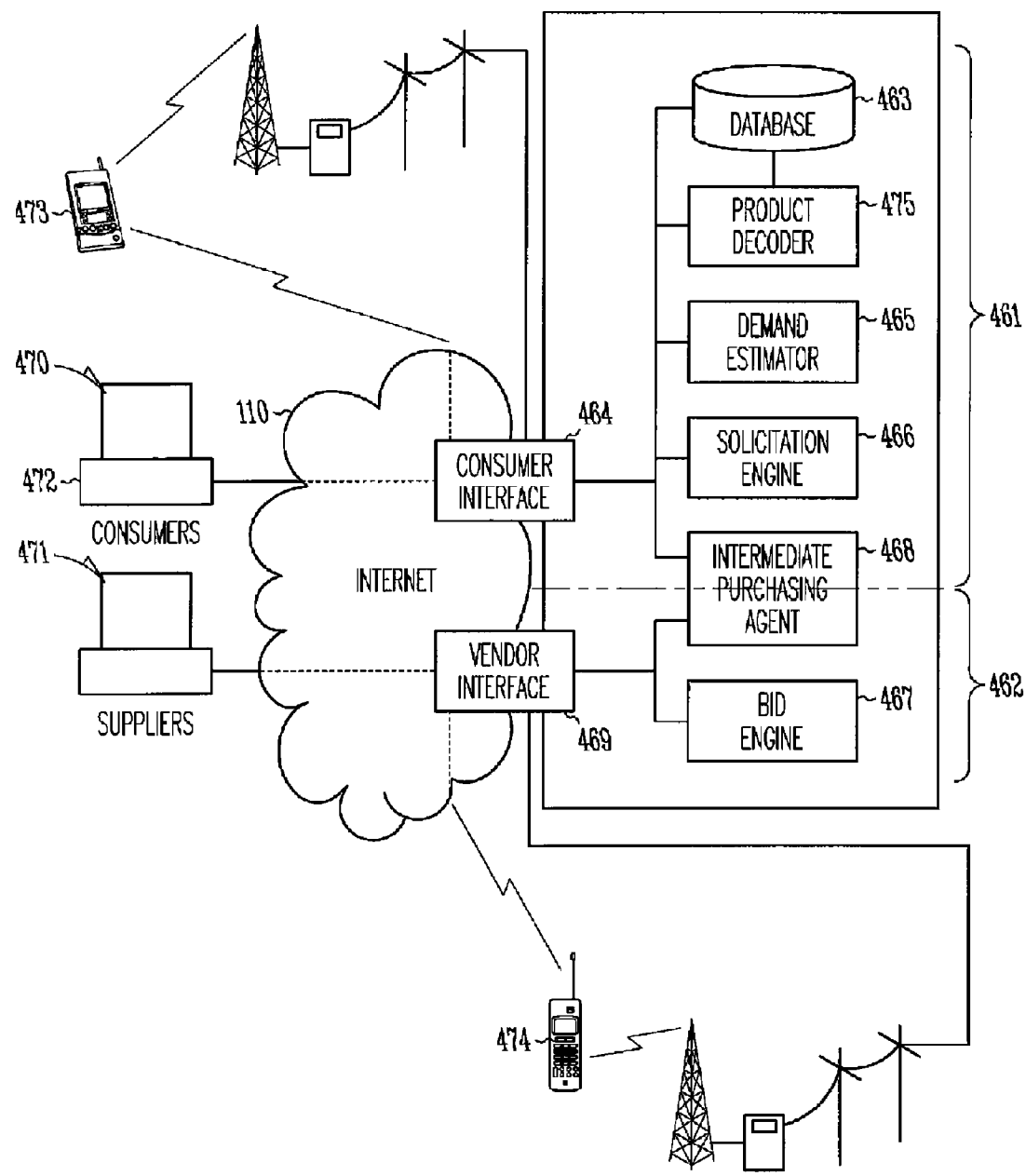
FIG. 4 illustrates a system for aggregating product interest using the Internet according to one embodiment of the present subject matter.

FIG. 4 illustrates a system for aggregating product interest using the Internet 110 and for developing commerce between consumers 470 who have expressed an interest in a product, and one or more suppliers 471 willing to sell the product according to one embodiment of the present subject matter. The system includes two portions, a consumer-centric portion 461 and a supplier-centric portion 462. The consumer-centric portion 461 of the system includes a database 463 for, among other things, aggregating information about products of interest selected by the consumers 470 and associating each product selection with the consumer who selected it. The consumer-centric portion 461 of the system also includes a consumer interface 464 to the system, a product decoder 475, a demand estimator 465 and a solicitation engine 466. The supplier-centric portion 462 of the system includes a supplier interface 469 and a bid engine 467. An intermediate purchasing agent 468 connects the consumer-centric portion 461 of the system with supplier portion 462 of the system. The intermediate purchasing agent 468 can provide a number of beneficial services, such as controlling information passed between consumers 470 and suppliers 471, and can even maintain anonymity between each if desired. Additionally, the intermediate purchasing agent 468 can operate the solicitation engine 466 and the bid engine 467, and assist in completing sales between the consumers 470 and the suppliers 471.

The consumer interface 464 is a component of the consumer-centric portion 461 of the system and provides consumer connections using the Internet 110. The consumer interface 464 includes an authentication function to allow consumers 470 to register and gain controlled access to the system. The web browser and/or software tool provides information to the consumer interface 464 about products of interest from various online locations, such as websites. The consumer interface 464 may be used to provide to the web browser of the consumer a software tool. The software tool can be downloaded from the consumer interface 464 for installation on the consumer's web browser device, such as a computer 472, Internet compatible cell phone and/or Personal Digital Assistant (PDA) 473. In various embodiments, the consumer interface allows the consumer to enter information about products of interest the consumer has found offline, from the system, or from the Internet 110.

In various embodiments, after registration with the system, the consumer can download and install a version of the software tool on both the consumer's home computer and Internet compatible PDA. As the consumer browses various web sites and notices a product that interests the consumer, the consumer can activate the web browser and/or software tool to automatically transmit information about the website, including product identifying information about the product of interest, to the system database 463. Product identifying information includes, for example, a web page URL, web page header, a UPC, a part number, a model number a retailer, a supplier, a manufacturer or combination thereof. In various embodiments, the database associates the consumer with the selected product identifying information. In another scenario, the consumer may notice a product while walking past a store or reading a magazine. The consumer can use the web browser and/or software tool to manually enter and transmit product identifying information to the database 463. Alternatively, the consumer may locate the product on a supplier website and activate the web browser and/or software tool to automatically transmit information about the website, including information that may identify the product of interest to the system database. In various embodiments, the software tool is implemented as a toolbar associated with the consumer's device web browser.

The information transmitted using the web browser tool is processed by the product decoder 475 to identify the products of interest selected by the consumer. For example, a consumer browsing a popular electronics web site for a flat panel television may find a television the consumer likes at a web page with the following Uniform Resource Locator (URL).

Upon activating the web browser and/or software tool, the above URL is transmitted to the system. Within the URL is a stock-keeping unit (SKU) number and the identity of the company. In various embodiments, these two pieces of information are decoded from the URL by the product decoder 475 to identify the product of interest selected by the buyer. Some website URLs include a Universal Product Code (UPC). In some embodiments, a web page header is also transmitted with the URL. The web page header will often contain specific information concerning the product or products displayed on the selected web page. For example, a header for the above identified page may include the following:

Samsung—52" 1080p Flat-Panel LCD HDTV—LN52A550—Windows Internet Explorer

In this example, the header information provides a detailed description of the television discussed on the web page including a manufacturer and a model number. In various embodiments, decoding information transmitted using the software tool is completed automatically. In some embodiments, decoding the information from the web software tool includes manual and automatic decoding. Some web sites, web site URLs or web site headers, include a Universal Product Code (UPC) identifying a consumer's selected product of interest. In various embodiments, decoding the information includes associating a UPC with the product information in the database. In various embodiments, a count of the number of consumer selections of a product is maintained by the database and associated with the product for further analysis.

In various embodiments, the first display portion of the consumer interface includes functionality for the consumer to view the consumer's past product selections. In various embodiments, the consumer interface may include a number of functions to assist the consumer in organizing and reviewing the consumer's selections. For example, one function allows the consumer to tag information to each selection. The tag, for example, may serve to name, rename, edit or update a selected product or information related to the product selection, remind the consumer of when the product was discovered, what the consumer remembers about the product that is not apparent from the information collected by the system, as well as, other information the consumer cares to note. Another function example, in combination with the database, allows the consumer to place products in one or more lists, or list groups, and tag a name to the list or list group. For example, the consumer may make a gift list and tag each product selection with a person for subsequent gift ideas. In another example, the consumer creates an organization structure such that each product can be associated and tagged with a room in the consumer's home. For example, upon selecting a product, the consumer associates the product with the "bathroom", "kitchen", "garage", "yard", "car" or "bedroom".

As discuss above, the database 463 aggregates consumer selections and allows each consumer to organize their selections. The database 463 also associates a consumer to their selections. In various embodiments, the database 463 stores consumer registration information, including information for completing a purchase using the system, such as a preferred method of payment, account information, shipping address or combinations thereof.

The demand estimator 465 analyzes the product information stored in the database 463 and processes the information for generating demand estimates. A demand estimate provides an indication of how many products users will buy if subsequently offered for purchase on the system. A particular demand estimate may be associated with a particular product, a group of similar products, a group of complimentary products or a group of products associated with a particular supplier. In one embodiment, for example, one demand estimate for a particular product is the count of consumer selections associated with the product. In various embodiments, the demand estimator uses one or more additional parameters to determine the demand estimate. For example, in addition to the count of selections for a particular product, the demand estimator may use age of the consumer selections, average cost of the particular product, current buying season, historical buy through of the product from previous sales, historical buy through of the consumers associated with the product's selections or combinations thereof to increase or decrease a demand estimate for a product or group of products. A goal of the system is to provide accurate demand estimates such that supplier risk is reduced in providing discounts when bidding to fulfill a demand for a product or group of products. Additionally, reduced supplier risk will encourage more supplier bids and, thus, more competitive supplier bids to supply the estimated demand.

The intermediate purchasing agent 468 is a component of the system that uses the demand estimates generated by the demand estimator 465. In various embodiments, the intermediate purchasing agent 468 monitors and compares a demand estimate to a predetermined threshold. If a demand estimate satisfies the threshold, the intermediate purchasing agent 468 triggers the bid engine 467 of the supplier centric portion 462 of the system. In various embodiments, the intermediate purchasing agent tracks statistics related to the demand estimate, such as aggregation rate of particular products. The various statistics are made available to users of the system, including suppliers, to encourage commerce activity. In some embodiments, the intermediate purchasing agent triggers the bid engine regardless of the demand estimate, for example when a supplier provides an unsolicited bid.

The bid engine 467 distributes requests for product fulfillment bids to the suppliers 471 and receives product fulfillment bids from the suppliers. In various embodiments, the bid engine 467 notifies one or more suppliers to request a product fulfillment bid electronically. The electronic notifications of the bid engine use, for example, electronic messaging to notify suppliers of a request for a fulfillment bid. Electronic messaging includes e-mail, text messaging and electronic data interchange (EDI). A bid request can have various formats. For example, a bid request may be distributed to a particular supplier for a quantity of a particular product. Another bid request may be distributed to a particular supplier for various quantities of a group of different products. Another bid request may be distributed to two or more suppliers for a particular product. A bid request can be distributed to two or more suppliers for a various quantities of a group of different products. In various embodiments, the requests for product fulfillment bids are distributed using the supplier interface through a display portion such as a dedicated website. In some embodiments, the request for product fulfillment bids is transmitted to a supplier's mobile communication device 474, such as a cell phone or PDA.

Upon distributing a product fulfillment bid request, the bid engine 467 receives bids from the suppliers 471. In various embodiments, the bids are received using a display portion of the supplier interface, such as a dedicated website. In some embodiments, supplier bids are received electronically using EDI, email or text messaging. For example, in one scenario, a supplier could use a cell phone 474 or Internet compatible PDA to quickly respond to a product fulfillment bid request distributed to the supplier using SMS text messaging. Such an efficient communication between the system and the supplier can enable the supplier to quickly dispose of excess inventory at a competitive price without investing much time or effort to market or advertise. In various embodiments, the opportunity to respond to the product fulfillment bid request is limited.

In various embodiments, suppliers 471 are provided with demand estimate information when notified of a product fulfillment bid request. Some embodiments use a first display portion of the supplier interface 469, such as a web site, to provide suppliers with a demand estimate. In various embodiments, demand estimates are normally available at all times to any user of the system, including suppliers. Demand estimate information may induce a supplier to make an unsolicited product fulfillment bid to the bid engine 467 with out first receiving a product notification bid request. In various embodiments, unsolicited bids are received by the bid engine 467 and analyzed by the intermediate purchasing agent 468. Upon qualification of the bid, a sale offering is developed by the intermediate purchasing agent 468 and the solicitation engine 466 is triggered to distribute notification of the sale to one or more of the system consumers 470.

The solicitation engine notifies users about a pending or upcoming sale. In various embodiments, the solicitation engine 466 notifies consumers associated with product selections identifying one or more products included in the sale. In some embodiments, consumers are notified using electronic messaging, including, for example, e-mail and text messaging, including SMS text messaging for mobile devices.

Upon receiving notice of a sale, consumers can submit a purchase order to the system. A purchase order is submitted using the consumer interface 464. In various embodiments, the purchase order is submitted using the first display portion of the consumer interface 464, such as a dedicated web site for example. In some embodiments, consumers use a cell phone, PDA 473 or other Internet compatible wireless communication device to submit a purchase order.

In various embodiments, consumers use a portable Internet software tool, sometimes called a widget, to monitor their product selections, receive system notifications and submit purchase orders for sale products. A portable Internet software tool is a software tool that communicates with the social shopping system and can be attached to a consumer's social web page, for example, Facebook.com and/or MySpace.com. The portable Internet software tool allows a consumer to access the consumer's data on the system remotely wherever the consumer can access his or her social networking web page.

In various embodiments, a transaction engine processes the sale of products to each of the consumers associated with a purchase order. In various embodiments, the transaction engine automatically processes purchase requests using information stored on the database. Such information, for example, may include the consumer's preferred method of electronic payment including the account information for charging the account, and "ship to" address information associated with the consumer. In various embodiments, the supplier interface includes an order processing connection for electronically completing a consumer order on the supplier's order processing system.

In various embodiments, user interactions with the system are processed and recorded as historical user information. In some embodiments, historical consumer information is used to generate demand estimates. For example, where a consumer has selected a large ticket product such as a 46" plasma television as a product of interest, but has failed to purchase the television after several sales of such televisions, the demand estimator uses this information to downgrade the interest of the consumer. Where the consumer has failed to purchase products at large discounts, the demand estimator further degrades the consumer's demand impact more than if past sales offered the product with only slight discounts over retail prices.

In various embodiments, supplier interactions with the system are processed and recorded. The historical information is used for accepting competing product fulfillment bids. For example, historical supplier data may be analyzed and result in a supplier score associated with a supplier. Upon considering a product fulfillment bid from two or more suppliers, each supplier's score may be considered to select a winning bid upon which to base a product sale.

Figure 5:
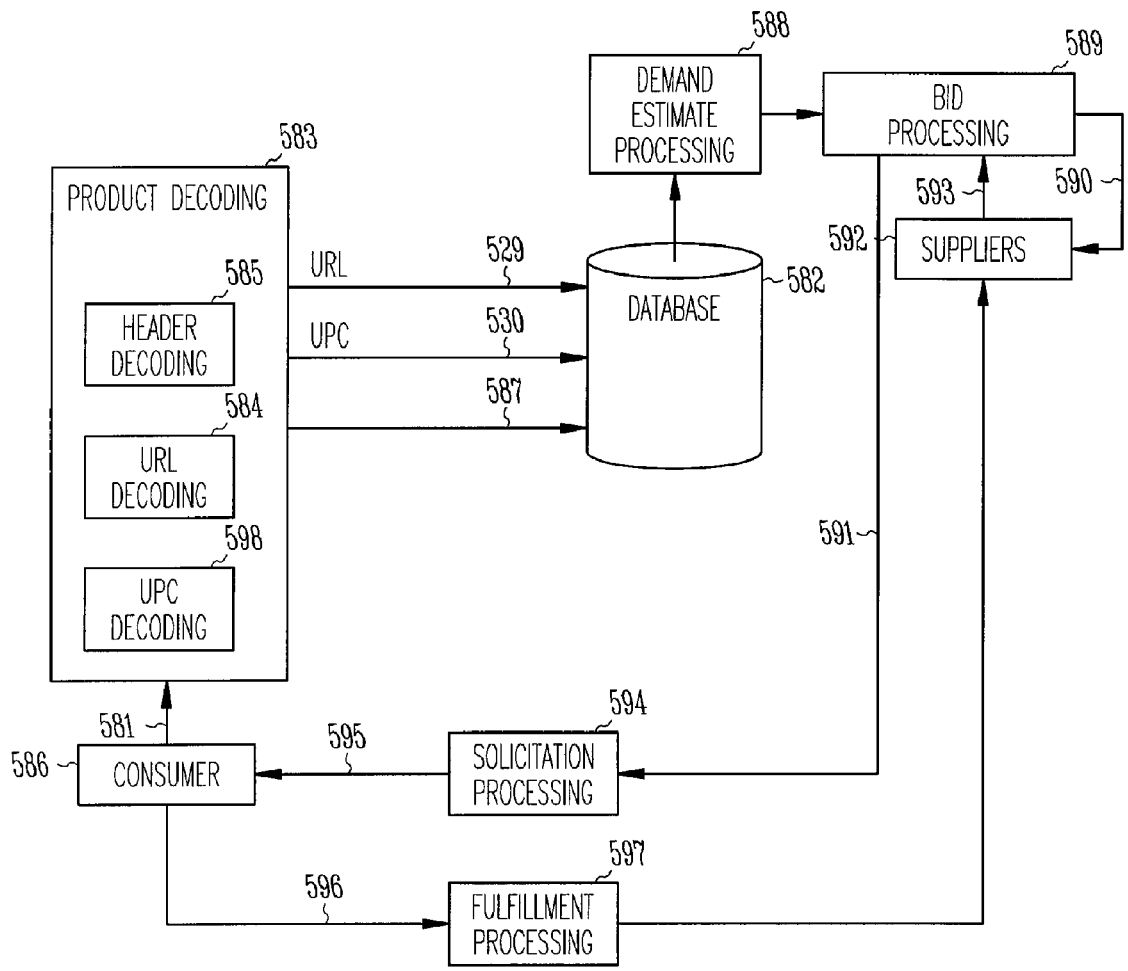
FIG. 5 is a process flow diagram of a system for aggregating consumer interest according to one embodiment of the present subject matter.

FIG. 5 illustrates a process flow diagram of a system for aggregating consumer interest using consumer initiated selections of products in which the consumer is interested in or is interested in purchasing. Consumer initiated product selections initiate a transfer of information 581 about the product to a database 582. The information is decoded 583 for identifying the product of interest. In various embodiments, the information transmitted to the database includes a website URL 529 and web page header information. In some embodiments, the URL and header information are decoded 585, 584 as the information is transmitted. The URL and header information are decoded 585, 584 to identify the product selected by the consumer and associate that information with a UPC 530 in the database. In various embodiments, the UPC is decoded 598 from the transmitted electronic information or information already resident in the database 582. In some embodiments, decoding the UPC 598 includes associating a UPC with the identified product. In various embodiments, decoding the UPC 598 also include searching for the UPC, for example, in the database or on the Internet using the transmitted electronic information about the product. In some embodiments, searching for the UPC is done automatically. In some embodiments, searching for the UPC is done manually. In various embodiments, searching for the UPC includes manual searching and automatic searching for the UPC. Alternatively, the URL and header information are collected in the database and subsequently decoded. As part of the transmission and decoding process 583, information 587 transmitted to the data base includes information related to a consumer identified with the product selection. In some embodiments, electronic information 587 transmitted to the database includes brand, model number and description information about the product of interest in the selection.

As product information is collected in the database, demand estimates 588 are determined from the database for each identified UPC. Upon a demand estimate reaching a threshold, bid processing 589 is initiated. Bid processing 589 includes electronically requesting product fulfillment bids from suppliers 592 to satisfy an associated demand estimate. Requests 590 for product fulfillment bids may be distributed to suppliers 592 in various forms. For example, a request may be distributed to one supplier for a quantity of one particular product. Another request may be distributed to multiple suppliers for a quantity of a particular product. Yet another request may be distributed to a plurality of suppliers for various quantities of various products. Another request may be distributed to a particular supplier for quantities of various products. In some embodiments, the intermediate purchasing agent triggers the bid processing regardless of the demand estimate, for example when a supplier provides an unsolicited bid. In various embodiments, requests for product fulfillment bids are distributed using a dedicated website.

Bid processing 589 also includes receiving 593 product fulfillment bids from one or more of the suppliers 592 in response to each request 590. Upon receiving one or more bids, bid processing 589 includes determining whether to offer for purchase one or more products based on a received bid.

When one or more bids are accepted 591 for developing into an opportunity for consumer purchasing, solicitation processing 594 uses the accepted bid(s) to electronically notify 595 consumers 586 of an upcoming, or current, opportunity to purchase a product. In various embodiments, at least the consumers associated with one or more of the products to be offered for purchase are notified. Fulfillment processing 597 receives and processes purchase orders 596 from the consumers 586 in response to the notification and completes the purchase of the product or products.

Figure 6A:
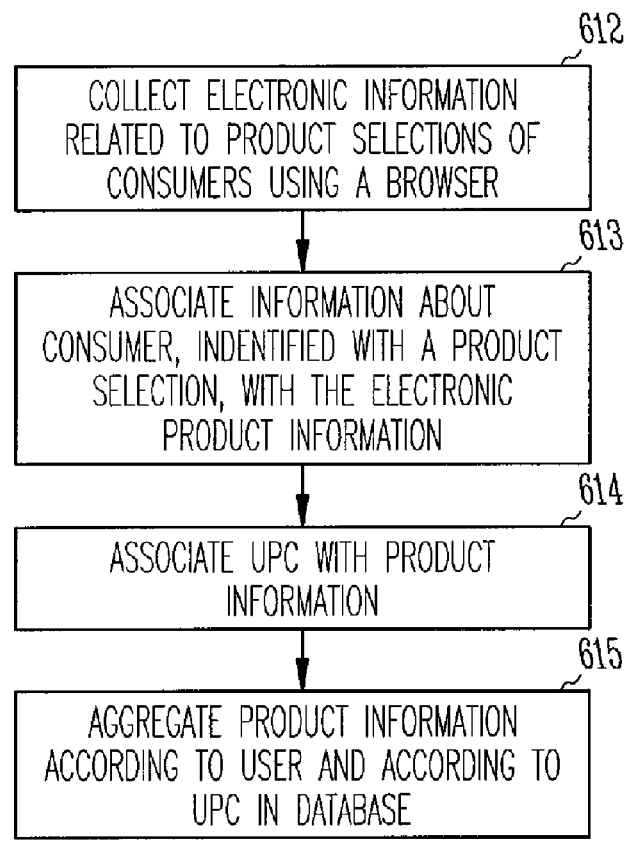
FIG. 6A is a flow diagram of a method for aggregating consumer interest in a consumer selected product according to one embodiment of the present subject matter.

FIG. 6A illustrates a flow diagram of a method for aggregating consumer interest in a consumer selected product according to one embodiment of the present subject matter. The method includes collecting electronic information, using a web browser and/or software tool, about a consumer selected product using consumer initiated product selections from disparate websites 612, associating consumer information, related to a consumer identified with the product selection, with the product information 613, associating a UPC with the product information 614 and aggregating the product information in a database, the information categorized by consumer and by UPC 615.

Figure 6B:
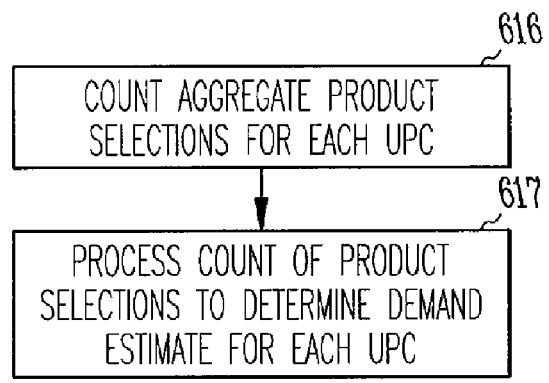
FIG. 6B is a flow diagram of a method for determining a demand estimate for a consumer selected product according to one embodiment of the present subject matter.

FIG. 6B illustrates a flow diagram of a method for determining a demand estimate for a consumer selected product according to one embodiment of the present subject matter. The method includes counting product selections for each product 616 and processing the count to determine a demand estimate for each product 617. In various embodiments, historical consumer data is used to de-rate the count to determine each demand estimate. Historical data, for example, may include data related to past interactions of each user with the system, including a measure related to how often a consumer purchased a product in which the consumer indicated interest in the product through a product selection.

Figure 6C:
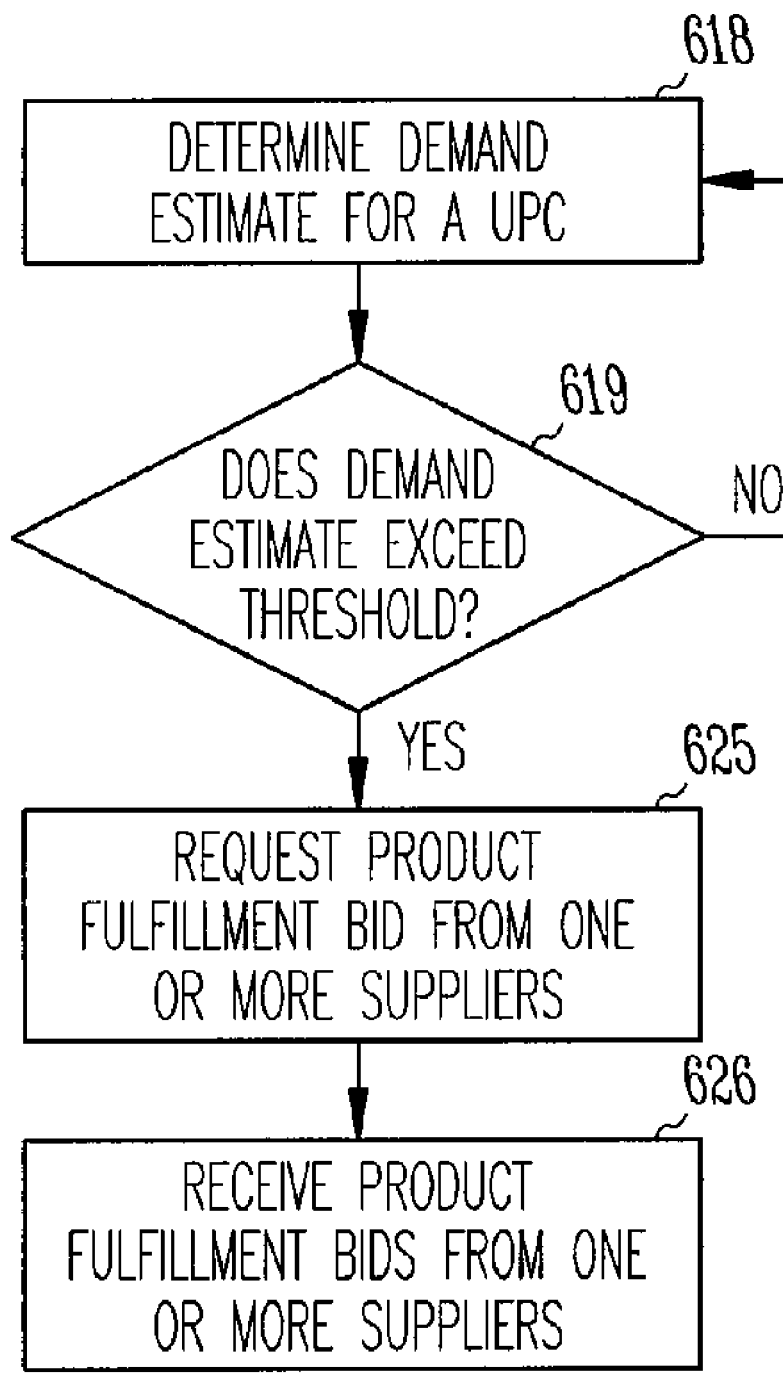
FIG. 6C is a flow diagram of a method for requesting product fulfillment bids according to one embodiment of the present subject matter.

FIG. 6C illustrates a flow diagram of a method for requesting product fulfillment bids according to one embodiment of the present subject matter. The method includes determining a demand estimate for a product 618. In various embodiments, the demand estimate is related to a count of consumer product selections associated with product information stored on a system database. The method further includes evaluating the demand estimate against a threshold 619. If the demand estimate does not exceed the threshold, the process continues to update the demand estimate and evaluate it against the threshold. Where the demand estimate for a product exceeds the threshold, product fulfillment bids are requested from one or more suppliers associated with the product 625. In various embodiments, the requests are distributed using electronic messaging. Examples of electronic messaging include e-mail, and text messaging including SMS text messaging for mobile devices. In some embodiments, the requests are distributed electronically using Electronic Document Interchange (EDI). The method further includes receiving product fulfillment bids from one or more suppliers 626. In various embodiments, the product fulfillment bids are received using electronic messaging. Examples of electronic messaging include e-mail, and text messaging including SMS text messaging for mobile devices. In some embodiments, the product fulfillment bids are received electronically using Electronic Document Interchange (EDI). In various embodiments, suppliers can manually submit product fulfillments bids using the dedicated system website.

This application is intended to cover adaptations and variations of the present subject matter. It is to be understood that the above description is intended to be illustrative, and not restrictive. The scope of the present subject matter should be determined with reference to the appended claim, along with the full scope of legal equivalents to which the claims are entitled.

What is claimed is:

1. A method for processing service selections by a plurality of consumers operating one or more web browsers, comprising:
    collecting electronic information, including web page titles, about the service selections by each consumer of the plurality of consumers, the service selections selected by the plurality of consumers operating the one or more web browsers from offerings at a plurality of disparate websites;
    associating information related to a consumer identified with a particular service selection with the electronic information using a processor;
    aggregating the electronic information in a database, the information categorized by web page information and by each consumer;
    digitally processing counts of selections by the plurality of consumers organized at least by web page title;
    requesting service fulfillment bids from one or more suppliers using the counts; and
    obtaining one or more bids from the one or more suppliers.

2. The method of claim 1, further comprising:
obtaining one or more purchase orders from one or more consumers of the plurality of consumers.

3. The method of claim 2, further comprising:
selling services to the one or more consumers based on the purchase orders and the one or more bids.

4. The method of claim 1, wherein requesting service fulfillment bids includes grouping fulfillment bid requests for a plurality of different services from the one or more suppliers.

5. The method of claim 1, wherein requesting service fulfillment bids includes requesting fulfillment bids of a quantity of a particular service from the one or more suppliers.

6. The method of claim 1, wherein requesting service fulfillment bids includes requesting a fulfillment bid for a plurality of different services from a particular supplier of the one or more suppliers.

7. The method of claim 1, wherein requesting service fulfillment bids includes requesting a fulfillment bid for a quantity of a particular service from a particular supplier of the one or more suppliers.

8. The method of claim 1, wherein collecting electronic information includes receiving at least one URL address from a consumer controlled browser toolbar.

9. The method of claim 1, wherein collecting electronic information includes receiving at least one service description.

10. The method of claim 1, wherein collecting electronic information includes receiving electronic information from a hot-key initiated transmission.

11. The method of claim 1, wherein requesting service fulfillment bids includes notifying the one or more suppliers using electronic messaging.

12. The method of claim 11, wherein requesting service fulfillment bids includes notifying the one or more suppliers using e-mail.

13. The method of claim 3, wherein selling services includes requesting service fulfillment from the one or more suppliers using electronic messaging.

14. The method of claim 13, wherein using electronic messaging includes using Electronic Data Interchange (EDI).

15. The method of claim 2, wherein obtaining one or more purchase orders includes notifying one or more consumers about a sales offer.

16. The method of claim 15, wherein notifying one or more consumers includes notifying one or more consumers using electronic messaging.

17. The method of claim 16, wherein notifying one or more consumers includes using e-mail.

18. The method of claim 15, wherein notifying one or more consumers includes presenting the sales offer to at least the one or more consumers using a predetermined website.

19. The method of claim 15, wherein notifying one or more consumers includes providing a SMS message to one or more of the one or more consumers.

20. The method of claim 15, wherein notifying one or more consumers includes using a RSS feed.

* * * * *